3,210,318
OXYMETHYLENE POLYMERS STABILIZED WITH EPOXIDES

Thomas J. Dolce and John H. Prichard, Springfield, N.J., assignors to Celanese Corporation of America, New York, N.Y., a corporation of Delaware
No Drawing. Filed Oct. 23, 1961, Ser. No. 147,092
20 Claims. (Cl. 260—45.8)

This invention relates to stabilization, and relates more particularly to the stabilization of oxymethylene polymers.

It is an object of this invention to provide novel compositions containing oxymethylene polymers and stabilizers therefor.

Another object of this invention is the provision of highly stable compositions containing oxymethylene polymers, which compositions have improved resistance to discoloration on molding at high temperatures.

Other objects of this invention will be apparent from the following detailed description and claims.

In accordance with one aspect of this invention an oxymethylene polymer is stabilized against thermal degradation by mixing therewith an epoxide containing at least two epoxy groups. A wide variety of epoxy compounds may be employed. For example, there may be used compounds in which the epoxy oxygens are attached to adjacent carbons of a cycloaliphatic compound, such as a cycloaliphatic ester, e.g. 3,4-epoxy-6-methylcyclohexyl-methyl - 3,4 - epoxy - 6 - methyl cyclohexane carboxylate, which has the formula:

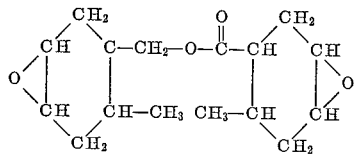

or a cycloaliphatic hydrocarbon, such as dicyclopentadiene dioxide having the formula

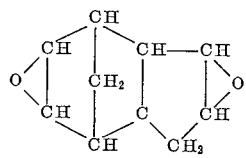

or in which an epoxy oxygen is attached to two carbons of a cycloaliphatic ring and another epoxy oxygen is attached to two carbons of an aliphatic chain, such as vinylcyclohexene dioxide having the formula

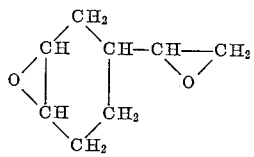

or dipentene dioxide. All the epoxy groups may be attached to carbons of an aliphatic chain, which may be a portion of an aliphatic or cycloaliphatic compound, or of an aromatic compound, e.g. a glycidyl polyether of a polyhydric phenol; examples of such glycidyl ethers are resorcinol diglycidyl ether, and the well-known reaction products of epichlorohydrin, bisphenol-A and sufficient caustic alkali to combine with the chlorine of the epichlorohydrin. Other epoxy compounds are the glycidyl ethers described in U.S. Patent 2,581,464; epoxidized drying oils such as epoxidized soya oil; and other epoxidized unsaturated compounds.

The amount of epoxy compound added is desirably less than about 5% preferably less than about 2%, based on the weight of the oxymethylene polymer, a particularly desirable range being about 0.1 to 1.0%.

The epoxy compound may be mixed with the oxymethylene polymer in any suitable manner, as by milling on rolls; or by blending in a common solvent such as anisole, followed by evaporation of solvent; or by dry blending, followed by extrusion of the blend at a temperature at which the oxymethylene polymer is plastic.

The epoxy compounds are particularly effective as stabilizers when there is also present a phenolic stabilizer for the oxymethylene polymer. Such phenolic stabilizers are well known to the art. Outstanding results have been obtained when the epoxy compound is mixed with a diphenylol alkane, particularly an alkyl-substituted diphenylolmethane such as 2,2'-methylene bis-(4-methyl-6-tertiary butyl phenol). Another, less desirable, diphenylolalkane is 4,4'-butylidene bis-(6-tertiary butyl-3-methyl phenol). Other phenolic stabilizers are 2,6-di-tertiary butyl-4-methyl phenol, octyl phenol and p-phenyl phenol. Suitable proportions of the phenolic stabilizer are about 0.05 to 2.0%, preferably about 0.1 to 0.5%, based on the weight of the oxymethylene copolymer.

The following examples are given to illustrate this invention further.

Example I

An oxymethylene polymer was produced by the copolymerization of trioxane and dioxolane or ethylene oxide in the presence of a cationic polymerization catalyst in the manner described in French Patent No. 1,221,148. This polymer contained oxymethylene groups and randomly distributed oxyethylene groups in a molar ratio of about 70:1. The oxymethylene polymer was subjected to a hydrolysis treatment to remove unstable oxymethylene end groups, as disclosed in copending application of F. M. Berardinelli, Serial No. 102,097 of April 11, 1961, now abandoned, in favor of Serial Number 372,390, filed June 3, 1964. The resulting polymer having an inherent viscosity of 1.3 was then blended with 0.5% of its weight of 2,2'-methylene bis-(4-methyl-6-tertiary butyl phenol), and with the epoxides listed below, in the proportions given below. Each blend was milled, in a sigma blade mixer, at 200° C. (which is above the melting point of the polymer) under nitrogen for 10 minutes (or at 200° C. in air for 7 minutes in other cases, as indicated below). The degradation rate in air at 230° C. was then determined for each product.

Epoxy compound: Degradation rate wt. loss, expressed as percent/minute
- A. 0.5° vinylcyclohexene dioxide (milled under N₂) ____ 0.038
- B. 1% vinylcyclohexene dioxide (milled under N₂) ____ 0.014
- C. 0.5% dicyclopentadiene dioxide (milled in air) ____ 0.012
- D. 1% dicyclopentadiene dioxide (milled in air) ____ 0.020
- E. 0.5% 3,4 - epoxy - 6-methylcyclohexylmethyl-3,4-epoxy-6 - methylcyclohexane carboxylate (milled in air) ____ 0.011
- F. 1% 3,4 - epoxy - 6 - methylcyclohexylmethyl-3,4 - epoxy-6-methylcyclohexane carboxylate (milled in air) ____ 0.012
- G. 0.5% resorcinol diglycidyl ether (milled under N₂, 7 minutes) ____ 0.009

Discs of each blend were compression molded at a temperature of 190° C. The discs from products E and F had especially good color.

Example II

Another sample of a hydrolyzed copolymer prepared as in Example I and having an inherent viscosity of 1.3 was blended with 0.5% of the phenolic stabilizer of Example I and 0.2% of Epon 812 and the blend was then milled at 200° C. under nitrogen for 15 minutes. The resulting product had a degradation rate in air at 230° C. of 0.031%/min.

Epon 812 is a liquid mixture of di- and tri-epoxides made by the condensation of epichlohydrin and glycerine. The resin has an epoxide functionally of 2.2 and contains approximately 10% by weight of tightly bound chlorine.

*Example III*

Example II was repeated, substituting 0.2% of Epon 1004. The degradation rate in air at 230° C. was 0.022%/min.

Epon 1004 is a solid resin (M.P. 95–105° C.) having the formula

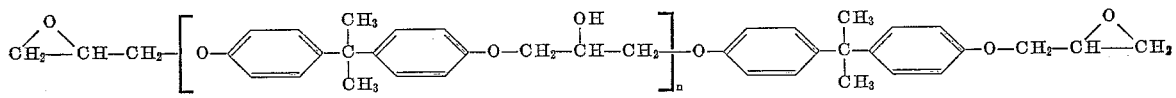

In the above examples, the inherent viscosity was measured in a 0.1% solution of the polymer in p-chlorophenol containing 2% of α-pinene. While the proportions of epoxide are preferably less than about 2% when the epoxide is used to stabilize the oxymethylene polymer, blends containing larger amounts, e.g. up to 50, 75% or even 99% of the blend, of epoxides having two or more epoxy groups may be produced if desired. Such blends may contain an added catalyst of the type known to be a curing or resinifying agent for polyepoxides, such as amines (e.g. triethylenediamine) or alcohols, in the amounts usually employed for catalyzing the curing of polyepoxides; molded or cast shaped articles may be made from such blends.

While the examples given above have used oxymethylene copolymers of the type disclosed in French Patent No. 1,221,148, in which there are spaced repeating units containing carbon-to-carbon linkages distributed in the polymer chain, and which may be described as having at least one chain containing at least 85 mole percent of oxymethylene (—OCH$_2$—) units interspersed with —O—R— units wherein R is a divalent radical containing at least two carbon atoms directly linked to each other and positioned in the chain between the two valences with any substituent in the R radical being inert, other oxymethylene homopolymers and copolymers may be used if desired. Thus, there may be used unmodified moldable solid oxymethylene homopolymers or end-capped homopolymers or copolymers, such as polymers capped with ester groups, e.g. polyoxymethylene diacetates, or capped with ether groups, e.g. polyoxymethylene dimethyl ethers or polyoxymethylene di(hydroxyethyl) ethers. The moldable, solid oxymethylene high polymer desirably contains at least about 80%, by weight, preferably at least about 95% by weight of oxymethylene units, in the form of chains of repeating oxymethylene units,

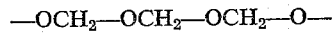

It may be linear and thermoplastic or cross-linked (as by irradiation) in a manner known to the art. Its inherent viscosity is preferably above 1, e.g. about 1.2 to 2.5.

The stabilized products of this invention may be molded, as by injection-molding, in the manner well known in the art of molding oxymethylene polymers, using, for example, polymer temperatures of about 190 to 220°. They may also be shaped by extrusion, blow-molding, melt-spinning (to form textile yarns or tows) and similar techniques.

While the use of polyepoxides is preferred, this invention also includes within its scope molding and extrusion compositions containing oxymethylene polymers and monoepoxides, such as styrene oxide, cyclohexene oxide  or vinyl cyclohexane oxide. The molding and extrusion compositions are generally in dry solid finely divided form. Thus they may be pellets or granules or powders comprising a solid oxymethylene polymer, the epoxide stabilizer (e.g. in the proportion of less than 5%, preferably less than 2%, most preferably about 0.1 to 1%), an antioxidant such as one of the phenolic stabilizers mentioned above in amount less than about 2%, and, where desired, solid pigmenting or filling ingredients.

It is to be understood that the foregoing detailed description is given merely by way of illustration and that many variations may be made therein without departing from the spirit of our invention.

Having described our invention what we desire to secure by Letters Patent is:

1. A stabilized composition comprising an oxymethylene polymer having at least about 80% by weight of oxymethylene units in the form of chains of repeating oxymethylene units and an 1,2-epoxy compound containing at least two epoxy groups, said epoxy compound being present in sufficient amount so that said polymer composition exhibits a greater degree of thermal stability than does said composition in the absence of said epoxy compound.

2. A composition as set forth in claim 1 in which the amount of epoxy compound is about 0.1 to 5.0% based on the weight of the oxymethylene polymer.

3. A composition as set forth in claim 2 and containing a phenolic stabilized for said polymer.

4. A composition as set forth in claim 3 in which said phenolic stabilizer is a diphenylol methane.

5. A composition as set forth in claim 2 and containing about 0.05 to 2% of 2,2'-methylene bis-(4-methyl-6-tertiary butyl phenol).

6. A composition as set forth in claim 5 in which the oxymethylene polymer is a copolymer having recurring oxymethylene units and about 1 to 20% by weight, of oxyethylene units.

7. A composition as set forth in claim 6 in which the epoxy compound is 3,4-epoxy-6-methylcyclohexylmethyl-3,4-epoxy-6-methyl cyclohexane carboxylate.

8. A composition as set forth in claim 6 in which the epoxy compound is dicyclopentadiene dioxide.

9. A composition as set forth in claim 6 in which the epoxy compound is vinylcyclohexene dioxide.

10. A composition as set forth in claim 6 in which the epoxy compound is resorcinol diglycidyl ether.

11. The composition of claim 3, wherein said oxymethylene polymer has at least 85 mole percent of recurring oxymethylene (—OCH$_2$—) units interspersed with

—O—R— units wherein R is a divalent radical containing at least two carbon atoms directly linked to each other and positioned in the chain between the two valences with any substituent in the R radical being inert.

12. A stabilized polymer composition comprising:
(a) an oxymethylene polymer having at least about 80% by weight of oxymethylene units in the form of chains of repeating oxymethylene units, and
(b) from about 0.1 to 5%, based upon the weight of polymer, of a 1,2-epoxy compound containing at least two epoxy groups wherein the epoxy oxygens are attached to adjacent carbons of the cycloaliphatic rings in a cycloaliphatic ester of a cycloaliphatic monoacid.

13. The composition of claim 2, wherein the epoxy oxygens are attached to adjacent carbon atoms of the cycloaliphatic rings in a cycloaliphatic compound.

14. The composition of claim 2, wherein at least one epoxy oxygen is attached to adjacent carbon atoms of a cycloaliphatic ring and at least one epoxy oxygen is attached to adjacent carbon atoms of an aliphatic chain, said aliphatic chain being directly bonded to said cycloaliphatic ring.

15. The composition of claim 2, wherein said epoxy compound is a glycidyl ether.

16. The composition of claim 13, wherein said glycidyl ether is a cycloaliphatic glycidyl ether.

17. The composition of claim 16, wherein said cycloaliphatic moiety contains directly bonded to adjacent carbon atoms thereof at least one epoxy oxygen.

18. A stabilized polymeric composition comprising:
(a) an oxymethylene copolymer having at least 85 mole percent of recurring oxymethylene (—OCH$_2$—)

units interspersed with —O—R— units wherein R is a divalent radical containing at least two carbon atoms directly linked to each other and positioned in the chain between the two valences with any substituent in the R radical being inert, and
(b) from about 0.1 to 5% based upon the weight of the polymer, of a 1,2-epoxy compound having at least two epoxy groups, wherein said epoxy compound is a glycidyl polyether of a polyhydric phenol.

19. A stabilized polymeric composition comprising:
(a) an oxymethylene copolymer having at least 85 mole percent of recurring oxymethylene (—OCH$_2$—)

units interspersed with —O—R— units wherein R is a divalent radical containing at least two carbon atoms directly linked to each other and positioned in the chain between the two valences with any substituent in the R radical being inert, and
(b) from about 0.1 to 5%, based upon the weight of the polymer, of a 1,2-epoxy compound having at least two epoxy groups, wherein said epoxy compound is a linear polymer of a polyhydric phenol and epichlorhydrin.

20. The composition of claim 19, wherein said polyhydric phenol is bisphenol-A.

References Cited by the Examiner

UNITED STATES PATENTS

| | | | |
|---|---|---|---|
| 2,376,354 | 5/45 | Gresham | 260—2 |
| 2,521,912 | 9/50 | Greenlee | 260—58 |
| 2,581,464 | 1/52 | Zech | 260—45.8 |
| 2,893,972 | 7/59 | Kubico et al. | 260—45.9 |
| 2,966,476 | 12/60 | Kralovec et al. | 260—45.95 |
| 3,027,352 | 3/62 | Walling et al. | 260—67 |
| 3,116,267 | 12/63 | Dolce et al. | 260—34.9 |
| 3,133,896 | 5/64 | Dolce et al. | 260—45.85 |
| 3,134,636 | 5/64 | Singleton | 8—55 |
| 3,144,431 | 8/64 | Dolce et al. | 260—45.85 |

OTHER REFERENCES

Megs on "Phenolic Resin Chemistry," Academic Press Inc., New York, 1958, pages 15–22.

WILLIAM H. SHORT, *Primary Examiner.*

ALPHONSO D. SULLIVAN, *Examiner.*